US009067630B2

(12) United States Patent
Cline

(10) Patent No.: US 9,067,630 B2
(45) Date of Patent: Jun. 30, 2015

(54) GOOSENECK TRAILER HITCH LOCK

(76) Inventor: Mark Cline, Dallas County, TX (US)

(*) Notice: Subject to any disclaimer, the term of this patent is extended or adjusted under 35 U.S.C. 154(b) by 854 days.

(21) Appl. No.: 12/589,030

(22) Filed: Oct. 16, 2009

(65) Prior Publication Data

US 2011/0088437 A1 Apr. 21, 2011

(51) Int. Cl.
| | |
|---|---|
| *B60R 25/00* | (2013.01) |
| *E05B 73/00* | (2006.01) |
| *B62D 53/10* | (2006.01) |
| *B60D 1/60* | (2006.01) |
| *B62D 53/06* | (2006.01) |

(52) U.S. Cl.
CPC .............. *B62D 53/10* (2013.01); *Y10T 70/5982* (2015.04); *B60D 1/60* (2013.01); *B62D 53/061* (2013.01)

(58) Field of Classification Search
USPC ................. 70/14, 229–232, 258; 280/507
See application file for complete search history.

(56) References Cited

U.S. PATENT DOCUMENTS

| | | | | |
|---|---|---|---|---|
| 4,691,935 | A * | 9/1987 | Brandt | 280/507 |
| 5,297,407 | A * | 3/1994 | Tarr | 70/232 |
| 5,343,720 | A * | 9/1994 | Slater | 70/14 |
| 5,987,938 | A * | 11/1999 | Frei | 70/14 |
| 6,761,050 | B2 * | 7/2004 | Rosenberg | 70/14 |
| 6,848,282 | B2 * | 2/2005 | Palzkill et al. | 70/14 |
| 6,880,368 | B1 * | 4/2005 | Ulbrich et al. | 70/14 |
| 6,925,842 | B1 * | 8/2005 | Hillabush et al. | 70/14 |
| 7,174,751 | B2 * | 2/2007 | Escalante, III | 70/14 |
| 7,665,755 | B2 * | 2/2010 | Thomsen | 280/507 |

* cited by examiner

*Primary Examiner* — Christopher Boswell
(74) *Attorney, Agent, or Firm* — W. Thomas Timmons

(57) ABSTRACT

A locking device according to the present invention, for use with a trailer gooseneck, the trailer gooseneck having a post with upper and lower ends, the upper end being attached to a trailer and the lower end. The lower end forms a recess and a pair of bore holes at a right angle to the centerline of the recess for accepting a coupler for receiving a hitch. The coupler is removed to allow insertion of the locking device. The locking device includes a body adapted to fit into the recess of the lower end, a pair of locking pins within the body of the locking device, a cam within the body of the locking device and a lock to prevent the cam from being turned when the lock is engaged. The locking pins face opposite directions and are adapted to be inserted into the bore hole on the two sides of the recess. When the body is inserted into the recess and the cam is turned in one direction, the cam moves the pair of locking pins outward so that the locking pins are inserted into the bore hole, but partially remain within the body. When the cam is turned in the opposite direction, the pair of locking pins are withdrawn into the body of the locking device and the locking device can be removed from the recess. In one form, return springs engage the pair of locking pins.

8 Claims, 2 Drawing Sheets

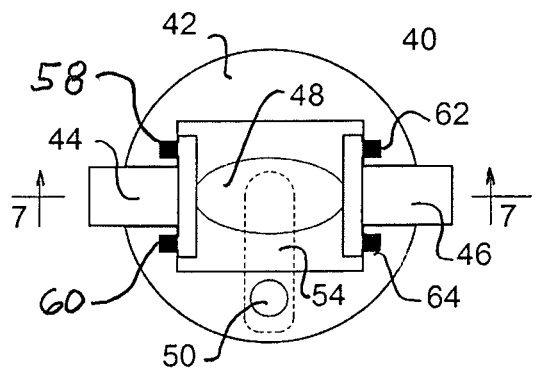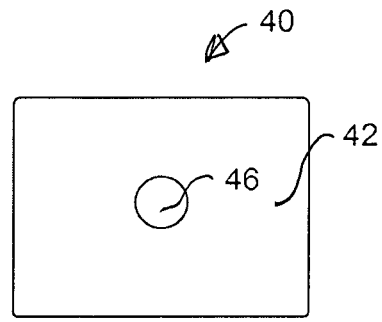
FIG. 4　　　　　FIG. 5
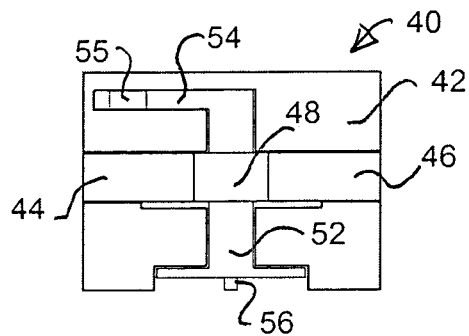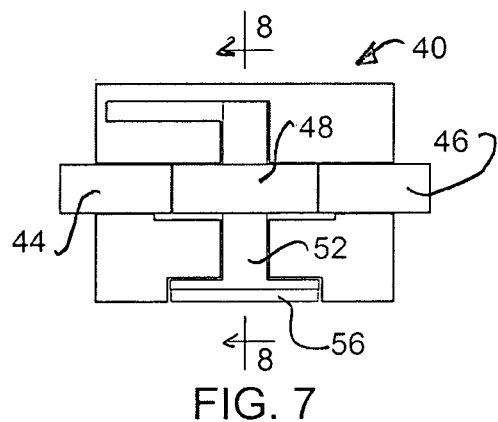
FIG. 6　　　　　FIG. 7
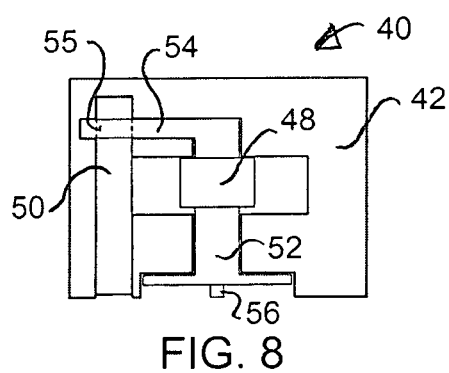
FIG. 8

GOOSENECK TRAILER HITCH LOCK

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to anti-theft devices for trailers, in particular for gooseneck trailers.

2. Description of Related Art

When a trailer is unhitched from its pull vehicle, the trailer and its goods are can be stolen by coupling the trailer to some other vehicle. Trailer hitches are of a limited variety, frequently being of standard types of shapes. Examples are ball and socket hitching devices in which the trailer coupler consists of a socket which mounts on a ball attached to the pull vehicle; king pin hitches which consist of cylindrical posts containing circumferential recesses and fit into matching openings mounted on the pull vehicle; and gooseneck hitches.

U.S. Pat. No. 5,181,405 issued Jan. 26, 1993 to Wheeler, and U.S. Pat. No. 5,255,545 issued Oct. 26, 1993 also to Wheeler, describe a locking devices for use with a gooseneck trailer. A slidable plate cooperates with a lock-body that, when aligned, receives a locking pin to secure the plate and lock body. The locking pin is in turn locked by insertion of a padlock. The system creates a box-like structure that obstructs the receiving socket of a gooseneck trailer. However, this device has the disadvantage of having multiple lock-body parts, which can get lost and which require alignment and assembly using at least two hands.

BRIEF SUMMARY OF THE INVENTION

A locking device according to the present invention, for use with a trailer gooseneck, the trailer gooseneck having a post with upper and lower ends, the upper end being attached to a trailer and the lower end being attached to a coupler. The lower end forms a recess and a pair of aligning bore holes at a right angle to the centerline of the recess for accepting a coupler for receiving a hitch. The coupler is adapted for releasable attachment to a towing vehicle. The locking device includes a body adapted to fit into the recess in place of the coupler, a pair of locking pins within the body of the locking device, a cam within the body of the locking device and a lock to prevent the cam from being turned when the lock is engaged. The locking pins face opposite directions and are adapted to be inserted into the bore hole on the two sides of the recess. When the body is inserted into the recess and the cam is turned in one direction, the cam moves the pair of locking pins outward so that the locking pins are inserted into the bore hole, but partially remain within the body. When the cam is turned in the opposite direction, the pair of locking pins are withdrawn into the body of the locking device and the locking device can be removed from the recess.

A preferred form of the locking device for use with a trailer gooseneck further includes return springs which engage the pair of locking pins. When the cam is turned in the direction for removing the locking pins from the recess, the return springs withdraw the locking pins back into the body, wherein the locking pins are removed from the recess.

In one arrangement of the locking device the lock includes a barrel lock through the cam or an element affixed to the cam, preventing the cam from turning.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

FIG. 4 is a top view in cutaway of the locking device of FIG. 2, in a locked position;

FIG. 5 is a right side elevation view of the locking device of FIG. 4 taken along the lines 5-5;

FIG. 6 is a front elevation view in cutaway of the locking device of FIG. 3 taken along the lines 6-6;

FIG. 7 is a front elevation view in cutaway of the locking device of FIG. 4 taken along the lines 7-7; and FIG. 8 is right side elevation view in cutaway of the locking device of FIG. 7 taken along the lines 8-8.

DETAILED DESCRIPTION OF THE INVENTION

Figure 1:
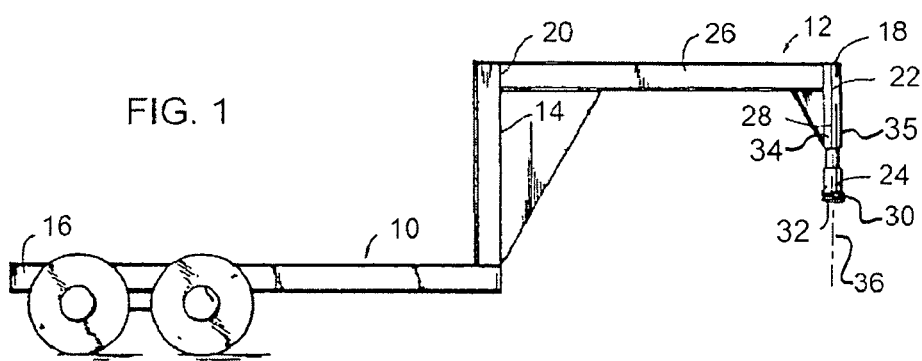
FIG. 1 is a left side elevation view of a trailer with a gooseneck trailer hitch.
Figure 2:
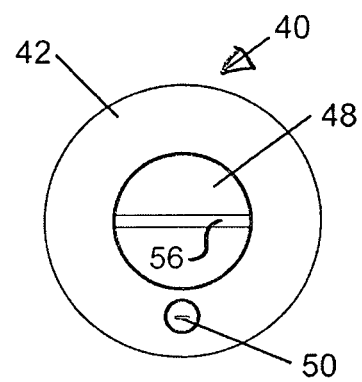
FIG. 2 is a bottom view of a locking device according to the present invention, for use with a trailer gooseneck.
Figure 3:
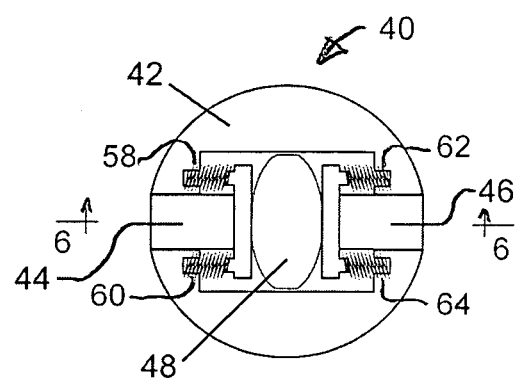
FIG. 3 is a top view in cutaway of the locking device of FIG. 2, in an unlocked position.

Referring now to the drawing, and in particular to FIG. 1, a trailer 10 with a gooseneck trailer hitch 12 is mounted on a front portion 14 of trailer 10. Front portion 14 is opposite rear portion 16 of trailer 10. Front portion 14 is for connecting to a vehicle for towing the trailer. Gooseneck trailer hitch 12 has a post 18 with an upper end 20, an elbow 22, a lower end 24, a horizontal component 26 and a vertical component 28. Lower end 24 of post 18 forming a recess 32 and a pair of aligning bore holes 34 and 35 at a right angle to centerline 36 of the recess for accepting a coupler 30. Coupler 30 receives a hitch. Coupler 30 is adapted for releasable attachment to a towing vehicle by means of the hitch.

Referring now to FIGS. 2 through 8, a locking device according to the present invention is referred to generally by reference numeral 40. Locking device 40 includes a body 42 adapted to fit into recess 32 of the coupler, a pair of locking pins 44 and 46 within the body of the locking device, a cam 48 within the body of the locking device and a lock 50 to prevent the cam from being turned when the lock is engaged. Cam 48 is affixed to a cam rod 52 and a locking arm 54. Locking arm 54 forms an opening 55 for insertion of barrel lock 50, so that when barrel lock 50 is inserted into opening 55 of locking arm 54, cam 38 is prevented from turning, so that the locking device cannot be removed from the recess. Cam rod 52 forms a turning element 56 which can be turned with plyers or a wrench or possibly by hand. Locking pins 44 and 46 face opposite directions and are adapted to be inserted into bore holes 34 and 35 on the two sides of the recess. When coupler 30 has been removed from recess 32, the locking device is inserted into the recess and cam 48 is turned in one direction by turning element 56. Cam 48 moves the pair of locking pins 44 and 46 outward so that the locking pins are inserted into the bore hole, but partially remain within body 42. When the cam is turned in the opposite direction, the pair of locking pins are withdrawn into the body of the locking device and the locking device can be removed from the recess.

A preferred form of the locking device for use with a trailer gooseneck further includes return springs 58 and 60 which engage locking pin 44 and return springs 62 and 64 which engage locking pin 46. When the cam is turned in the direction for removing the locking pins from the recess, the return springs withdraw the locking pins back into the body, wherein the locking pins are removed from the recess.

In one embodiment, lock 50 comprises a barrel lock through the cam or an element affixed to the cam, preventing the cam from turning. In such an embodiment, the barrel lock might comprise a cylinder lock.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A locking device for use with a trailer gooseneck when the trailer gooseneck is not attached to a towing vehicle, the trailer gooseneck having a post with upper and lower ends, the upper end being attached to a trailer and the lower end forming recess and a pair of aligning bore holes at a right angle to the centerline of the recess for accepting a coupler for receiving a hitch, the coupler being adapted for releasable attachment of the trailer gooseneck to a towing vehicle, said locking device comprising in combination:
   (a) a body adapted to fit into the lower end of the post in place of the coupler when the trailer gooseneck has been removed from the coupler of the towing vehicle;
   (b) a pair of locking pins within the body of the locking device, wherein the locking pins face opposite directions and are adapted to be inserted into the bore holes on the two sides of the recess;
   (c) a cam within the body of the locking device, wherein when the body is inserted into the recess and the cam is turned in one direction, the cam moves the pair of locking pins outward so that the locking pins are inserted into the bore holes, but partially remain within the body, and when the cam is turned in the opposite direction, the pair of locking pins are withdrawn into the body of the locking device and the locking device can be removed from the recess; and
   (d) a lock to prevent the cam from being turned when the lock is engaged.

2. A locking device according to claim 1, further comprising return springs which engage the pair of locking pins, wherein when the cam is turned in the direction for removing the locking pins from the recess, the return springs withdraw the locking pins back into the body, wherein the locking pins are removed from the recess.

3. A locking device according to claim 2, further including an element affixed to the cam, wherein the lock comprises a barrel lock through the cam or the element affixed to the cam, preventing the cam from turning.

4. A locking device according to claim 3, further including a cylinder lock to secure the barrel lock.

5. A locking device according to claim 4, wherein the element affixed to the cam comprises a locking arm forming an opening for insertion of the barrel lock, whereby the insertion of the barrel lock into the opening prevents the cam from turning.

6. A locking device according to claim 1, further including an element affixed to the cam, wherein the lock comprises a barrel lock through the cam or the element affixed to the cam, preventing the cam from turning.

7. A locking device according to claim 6, further including a cylinder lock to secure the barrel lock.

8. A locking device according to claim 7, wherein the element affixed to the cam comprises a locking arm forming an opening for insertion of the barrel lock, whereby the insertion of the barrel lock into the opening prevents the cam from turning.

* * * * *